Sept. 29, 1959    A. H. MAGG ET AL    2,906,138
GEAR SHIFTING MECHANISM
Filed Dec. 23, 1955

Inventors
ANTON SCHRODE,
JOSEF SCHMAE,
ALFRED MAGG,
RUDOLF JEDLITSCHKA,
BY Parry & Giese
ATTORNEYS

United States Patent Office 2,906,138
Patented Sept. 29, 1959

2,906,138

GEAR SHIFTING MECHANISM

Alfred H. Magg, Friedrichshafen, Rudolf Jedlitschka, Schwabisch Gmund, Anton Schrode, Friedrichshafen, and Josef Schmäh, Schwabisch Gmund, Germany, assignors to Zahnradfabrik Friedrichshafen, Friedrichshafen am Bodensee, Germany Application December 23, 1955, Serial No. 555,165

Claims priority, application Germany December 24, 1954

3 Claims. (Cl. 74—473)

This invention relates to gear shifting mechanism and more particularly to a gear shifting lever arrangement which precludes accidental shifting into reverse gear.

It is an object of the invention to provide a mechanism which will preclude accidental shifting into reverse gear wherein the elements of the mechanism are extremely simple in form and cheap to manufacture.

Briefly, the invention contemplates the provision of a gear shift lever having a finger with a sloped surface maintained in abutment with the sloped surface of one of the gear forks. The construction is such that motion of the gear shift lever to engage the fork of the reverse gear can be accomplished only by overcoming a certain amount of resilient resistance occasioned in moving one of the sloping surfaces arcuately with relation to the other of such surfaces so that a certain degree of force is required. Thus, a conscious degree of force is brought to bear in shifting the lever; it cannot accidentally slip into reverse gear.

Our invention will now be described in conjunction with the appended drawing in which.

Figure 1:
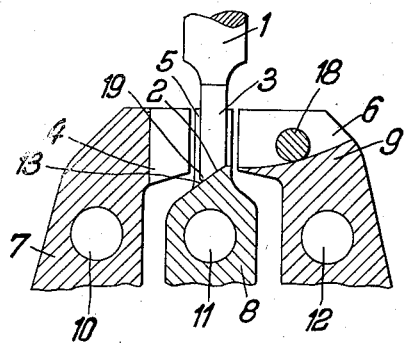
Fig. 1 is a cross-section of our invention taken longitudinally through certain shift forks and showing the neutral position of the gear shift lever.

Referring now to the drawing, the invention comprises a gear shift lever 1 having a sloping surface 2 terminating the end of an actuating finger 3 integral with the lever.

The lever will be understood to be rockably mounted so as to engage in any of the channels 4, 5, or 6 of shift forks 7, 8, or 9 respectively, to shift the forks on the respective rods 10, 11, and 12 in the usual manner.

It will be understood that channel 6 is in the reverse gear fork 9.

Figure 2:
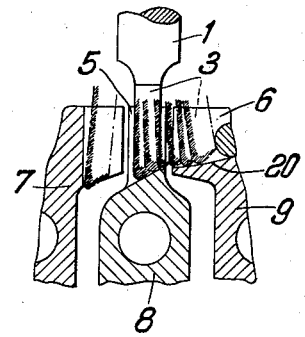
Fig. 2 is a longitudinal section showing various positions of the lever.
Figure 3:
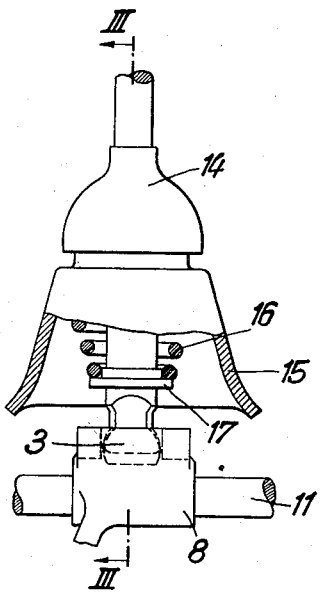
Fig. 3 is a fragmentary section taken in a direction at right angles to the view of Figs. 1 and 2.

The sloping surface 2 at the end of the finger 3 engages the complementarily sloping surface 13 formed on the top edge of the center shift fork 8. The lower end of the sloping surface 2 terminates in a curvature 19 such that a smooth, sliding motion is effected when the lever 1 is rocked so as to bring the finger 3 into the channel 6 against the stop pin 18, as illustrated in Fig. 2, which figure also illustrates other rocked positions of the lever.

The lever is mounted for universal mounting by means of a cap 14, a bell housing 15, and a concentric spring 16 which bears against flange 17 fixed above the finger 3. Thus, it will be understood that the lever 1 may be rocked in any direction as by conventional universal mounting means. Accordingly, when the terminus 2 rides up on the slope 13 a reactive force lifts the lever against the pressure of the spring 16. In this way a definitely pre-determined degree of resistance is afforded which must be overcome by physical effort in order to completely slide the curved end 19 past the sloped surface 13 so as to move the finger 3 into the channel 6 of the reverse gear shifting form. In other words, the finger 3 moves in an upward direction against the pressure of the spring during rocking of the lever and finally comes to rest in abutment with the pin 18.

In the manner just described the finger 3 is substantially prevented from slipping into reverse shifting position, except by conscious exercise of force. When the finger arrives in the channel 6 the curved portion 19 slides on the curved surface 20 formed in the fork and presses thereagainst so as to provide a deterrent against the accidental slipping out of reverse shifting position.

We claim:

1. In a gear shifting mechanism a gear shift lever having an actuating finger provided with a sloped surface, a first shift fork having a complementarily sloped surface engageable by the sloped surface of said finger, said lever being mounted for rocking in a direction to encounter resistance to said rocking, by virtue of sliding abutment of said sloped surfaces, and an additional fork disposed to be engaged by said actuating finger after said finger has moved beyond said first-mentioned shift fork, including means for biasing said lever in a direction to resist force effected by said sloped surface of said fork against the sloped surface of said finger.

2. A mechanism as set forth in claim 1, the sloping surface on said finger terminating on a rounded heel which slidably engages the surface of said first-mentioned shift fork.

3. In a mechanism as set forth in claim 2, said additional shift fork being provided with a surface engageable by the rounded heel of said actuating finger to effect a frictional detent against return motion of said lever, said biasing means effecting frictional pressure of said finger against said latter surface.

References Cited in the file of this patent

UNITED STATES PATENTS

| 1,830,797 | Lapsley | Nov. 10, 1931 |
| 1,877,540 | Thompson | Sept. 13, 1932 |
| 2,327,550 | Peterson et al. | Aug. 24, 1943 |
| 2,538,653 | Perkins | Jan. 16, 1951 |